US012620673B2

(12) United States Patent
Kim et al.

(10) Patent No.: US 12,620,673 B2
(45) Date of Patent: May 5, 2026

(54) POUCH-SHAPED BATTERY CELL INCLUDING ELECTRODE LEAD CAPABLE OF MAINTAINING UNIFORM INTERNAL PRESSURE AND BATTERY PACK INCLUDING THE SAME

(71) Applicant: LG Energy Solution, Ltd., Seoul (KR)

(72) Inventors: Kee Bum Kim, Daejeon (KR); Sei Woon Oh, Daejeon (KR); Ye Jin Nam, Daejeon (KR); Dong Hee Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 729 days.

(21) Appl. No.: 17/915,297

(22) PCT Filed: Nov. 1, 2021

(86) PCT No.: PCT/KR2021/015542
§ 371 (c)(1),
(2) Date: Sep. 28, 2022

(87) PCT Pub. No.: WO2022/092954
PCT Pub. Date: May 5, 2022

(65) Prior Publication Data
US 2023/0147700 A1      May 11, 2023

(30) Foreign Application Priority Data
Nov. 2, 2020    (KR) ........................ 10-2020-0144469

(51) Int. Cl.
*H01M 50/178*        (2021.01)
*H01M 10/48*         (2006.01)
(Continued)

(52) U.S. Cl.
CPC ....... *H01M 50/367* (2021.01); *H01M 10/482* (2013.01); *H01M 50/105* (2021.01); *H01M 50/178* (2021.01); *H01M 50/211* (2021.01)

(58) Field of Classification Search
CPC ............. H01M 50/367; H01M 50/178; H01M 50/105; H01M 50/211; H01M 10/482
See application file for complete search history.

(56) References Cited

U.S. PATENT DOCUMENTS

2008/0026283 A1* 1/2008 Park .................... H01M 50/578
                                                                    429/61
2010/0239895 A1* 9/2010 Yang .................... H01M 50/119
                                                                    429/53
(Continued)

FOREIGN PATENT DOCUMENTS

CN         104137293 A      11/2014
CN         104603985 A       5/2015
(Continued)

OTHER PUBLICATIONS

EPO machine generated English translation of KR 2018-0023817 A (Year: 2018).*

(Continued)

*Primary Examiner* — Kimberly Wyluda
(74) *Attorney, Agent, or Firm* — Lerner David LLP

(57) ABSTRACT

The present invention relates to a pouch-shaped battery cell including a battery case made of a laminate sheet, an electrode assembly received in the battery case, the electrode assembly having an electrode tab protruding therefrom, an electrode lead electrically connected to the electrode tab, the electrode lead extending outwards from the battery case, and a gas discharge portion located in the electrode lead, wherein
(Continued)

it is possible to prevent the internal pressure of the pouch-shaped battery cell from being increased to a predetermined level or more.

10 Claims, 7 Drawing Sheets

(51) Int. Cl.
    *H01M 50/105*     (2021.01)
    *H01M 50/211*     (2021.01)
    *H01M 50/367*     (2021.01)

(56)         References Cited

U.S. PATENT DOCUMENTS

| | | | |
|---|---|---|---|
| 2012/0121942 A1 | 5/2012 | Kim | |
| 2012/0225343 A1* | 9/2012 | Choi | H01M 50/446 |
| | | | 252/519.15 |
| 2014/0011060 A1 | 1/2014 | Yang et al. | |
| 2015/0072185 A1 | 3/2015 | Cho et al. | |
| 2018/0114964 A1 | 4/2018 | Kim et al. | |
| 2019/0348722 A1 | 11/2019 | Hernley et al. | |
| 2020/0127337 A1 | 4/2020 | Kim et al. | |
| 2020/0287186 A1 | 9/2020 | Kim et al. | |
| 2021/0341068 A1 | 11/2021 | Sasaki et al. | |

FOREIGN PATENT DOCUMENTS

| | | | |
|---|---|---|---|
| EP | 3579326 A1 | 12/2019 | |
| IT | 202000017428 A1 | 10/2020 | |
| JP | 2003031206 A | 1/2003 | |
| JP | 2009272281 A | 11/2009 | |
| JP | 2011142003 A | * | 7/2011 |
| JP | 2015090760 A | 5/2015 | |
| JP | 2015536536 A | 12/2015 | |
| JP | 2016081934 A | 5/2016 | |
| JP | 2018525804 A | 9/2018 | |
| KR | 20120051579 A | 5/2012 | |
| KR | 20130117637 A | 10/2013 | |
| KR | 20140049748 A | 4/2014 | |
| KR | 20170027150 A | 3/2017 | |
| KR | 2017-0037157 A | * | 4/2017 |
| KR | 2017-0063234 A | * | 6/2017 |
| KR | 20180023817 A | 3/2018 | |
| KR | 20190139134 A | 12/2019 | |
| KR | 2020063058 A | 4/2020 | |
| KR | 20200046403 A | 5/2020 | |
| KR | 20200059688 A | 5/2020 | |

OTHER PUBLICATIONS

EPO machine generated English translation of KR 2017-0063234 A (Year: 2017).*
EPO machine generated English translation of KR 2017-0037157 A (Year: 2017).*
EPO machine generated English translation of JP 2011-142003 A, (Year: 2011).*
Search Report dated Mar. 7, 2024 from the Office Action for Chinese Application No. 202180026009.8 issued Mar. 15, 2024, 3 pages.
International Search Report for Application No. PCT/KR2021/015542 mailed Feb. 15, 2022, 2 pages.
Extended European Search Report including Written Opinion for Application No. 21886948.5 dated Aug. 12, 2024, pp. 1-9.

* cited by examiner

【FIG. 1】
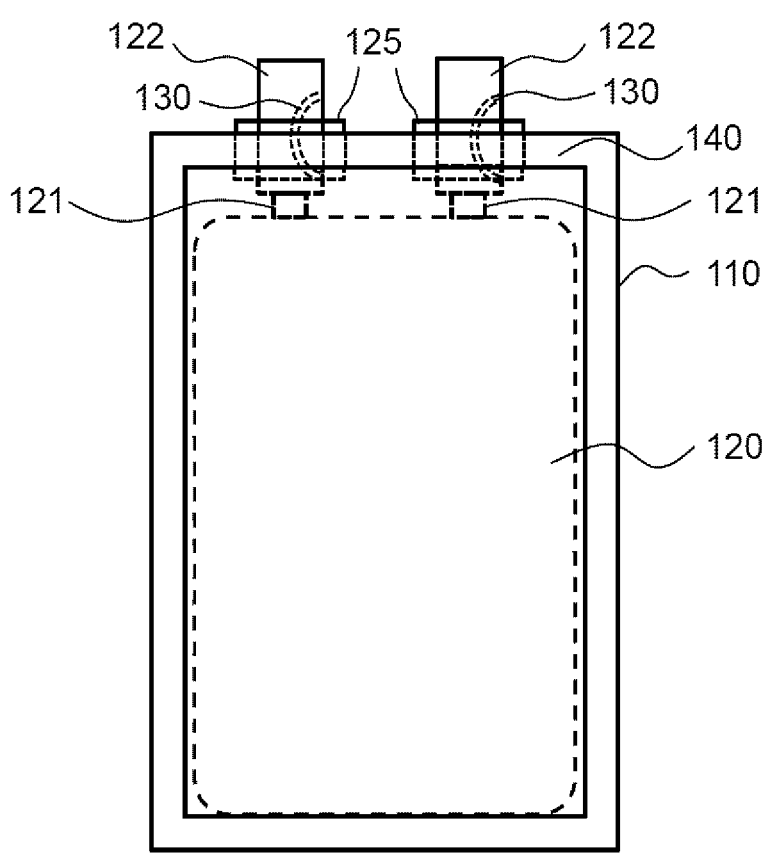

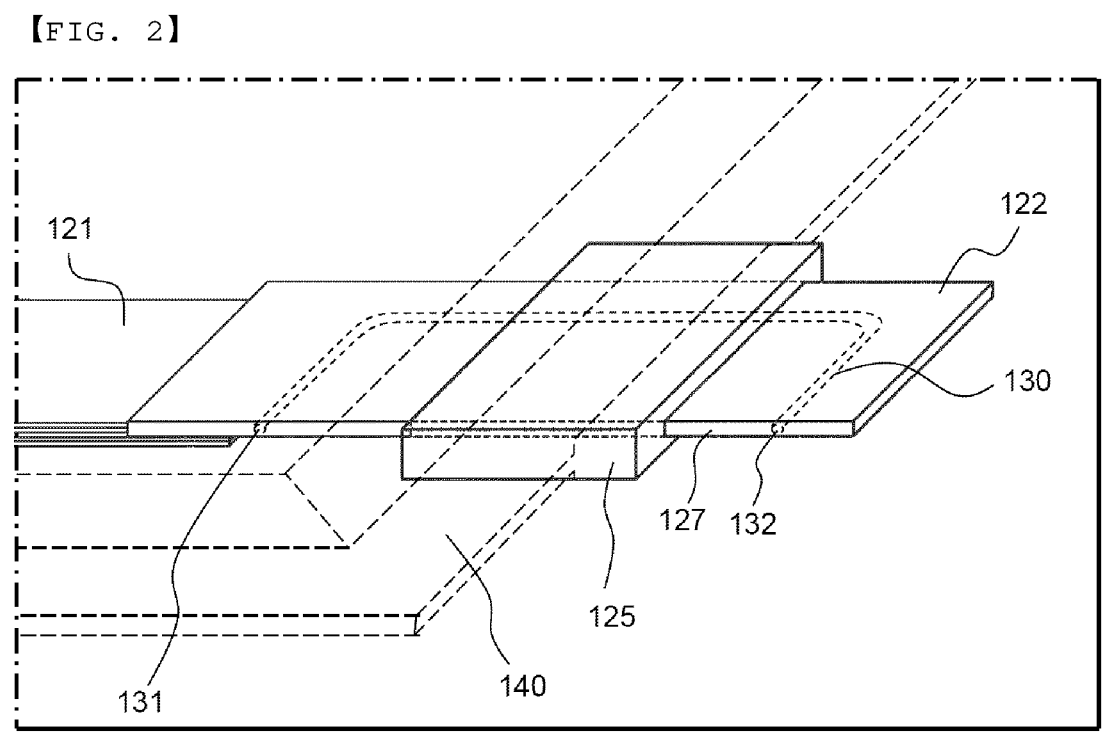

【FIG. 2】

【FIG. 3】
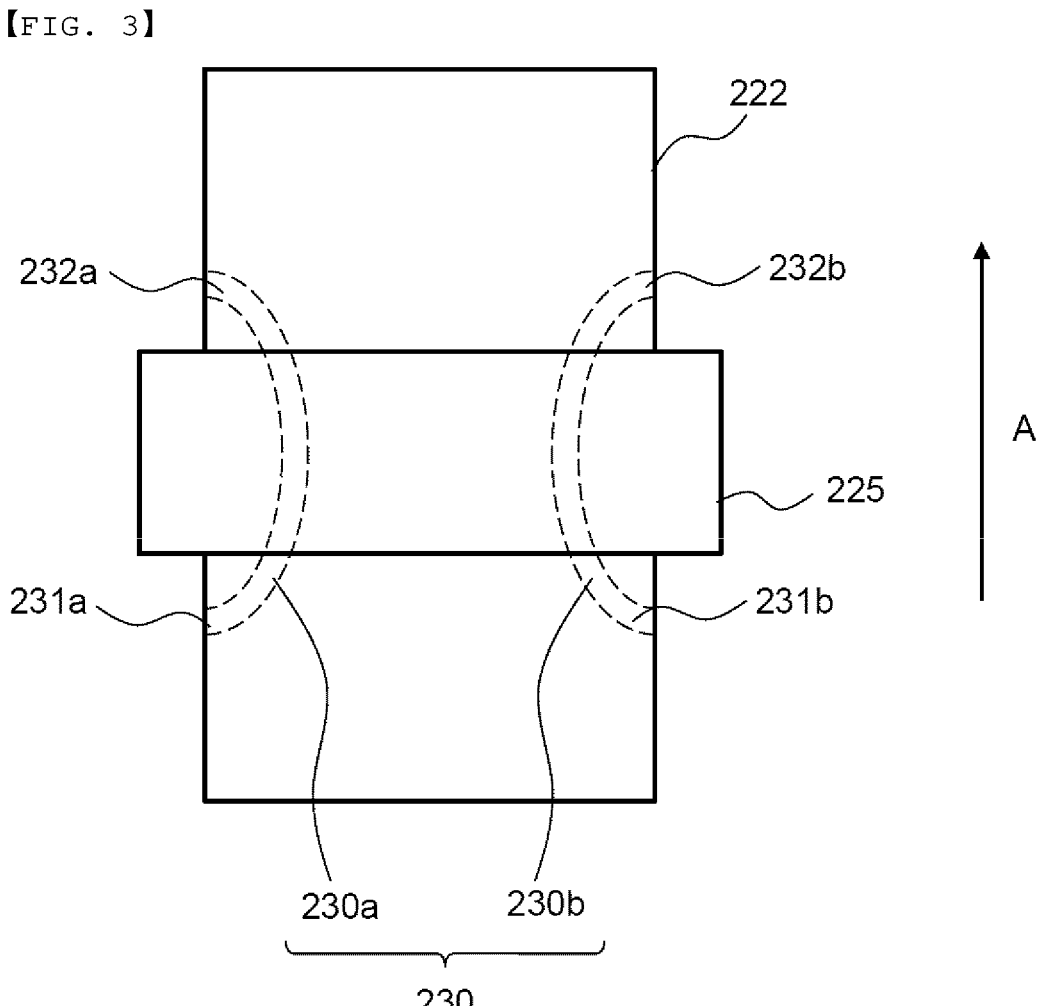

【FIG. 4】
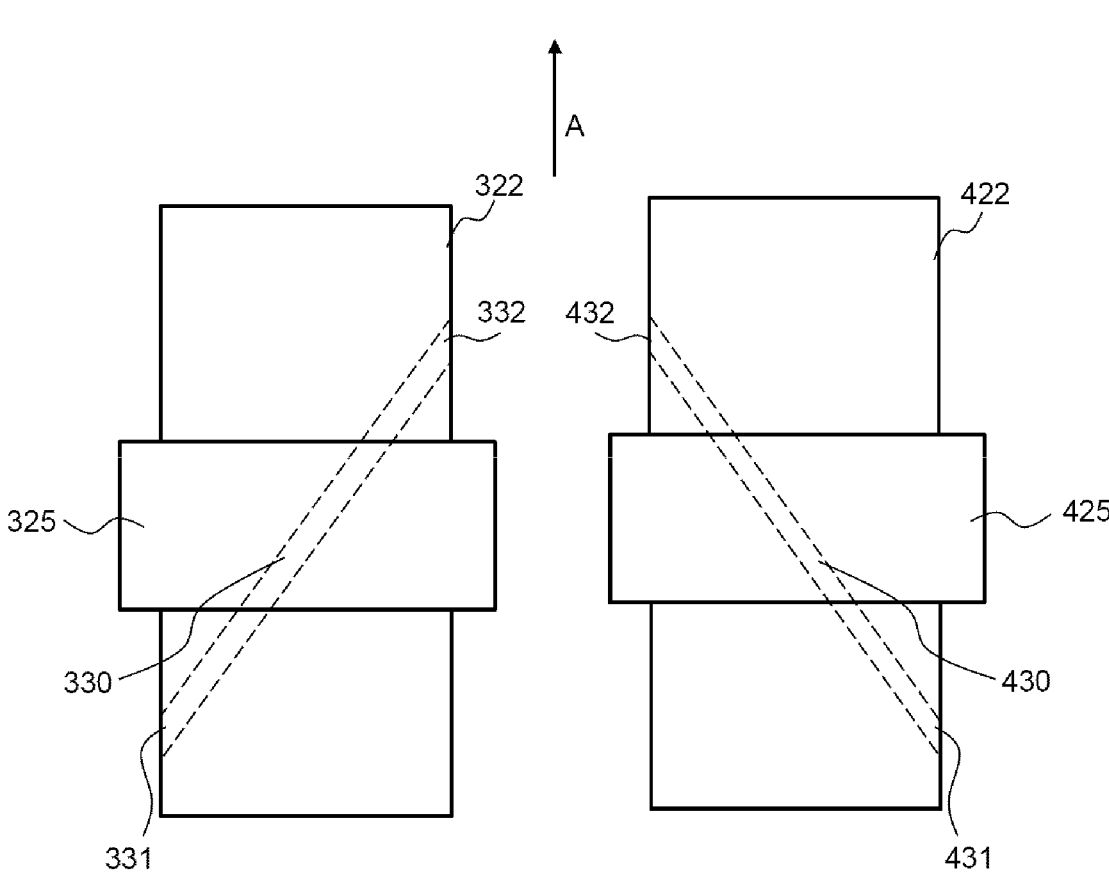

【FIG. 5】
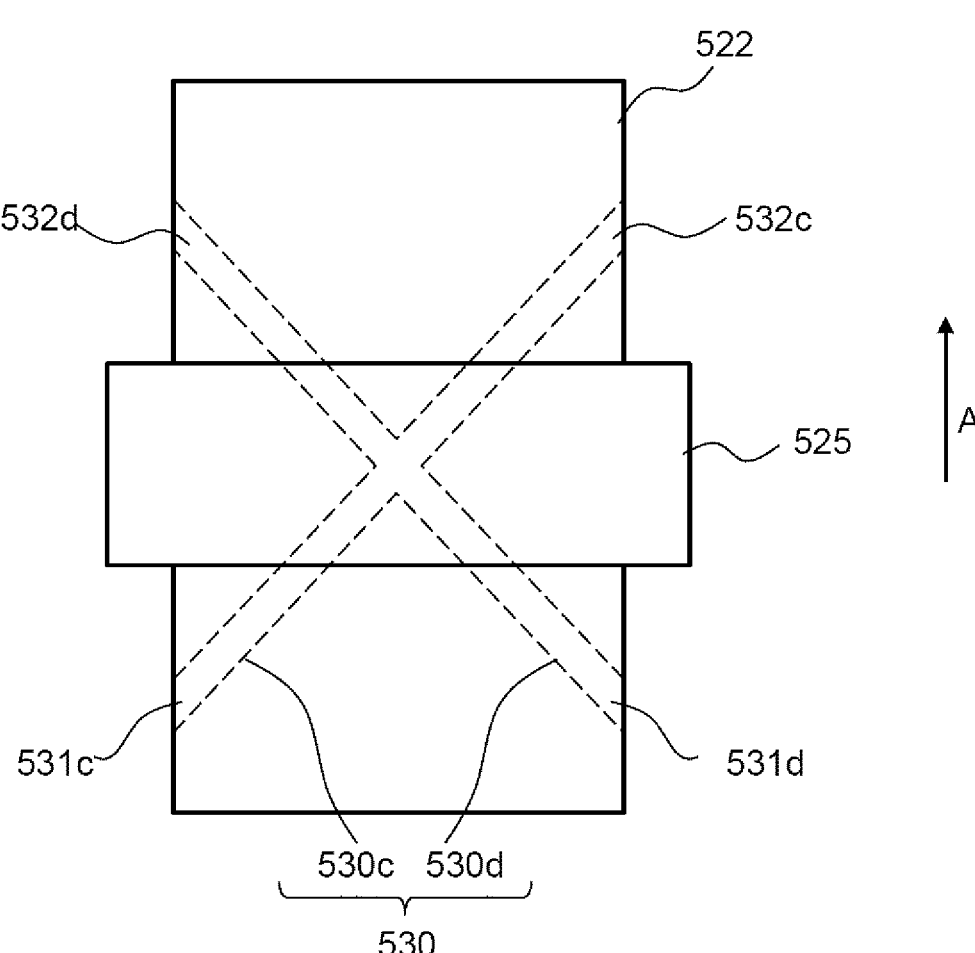

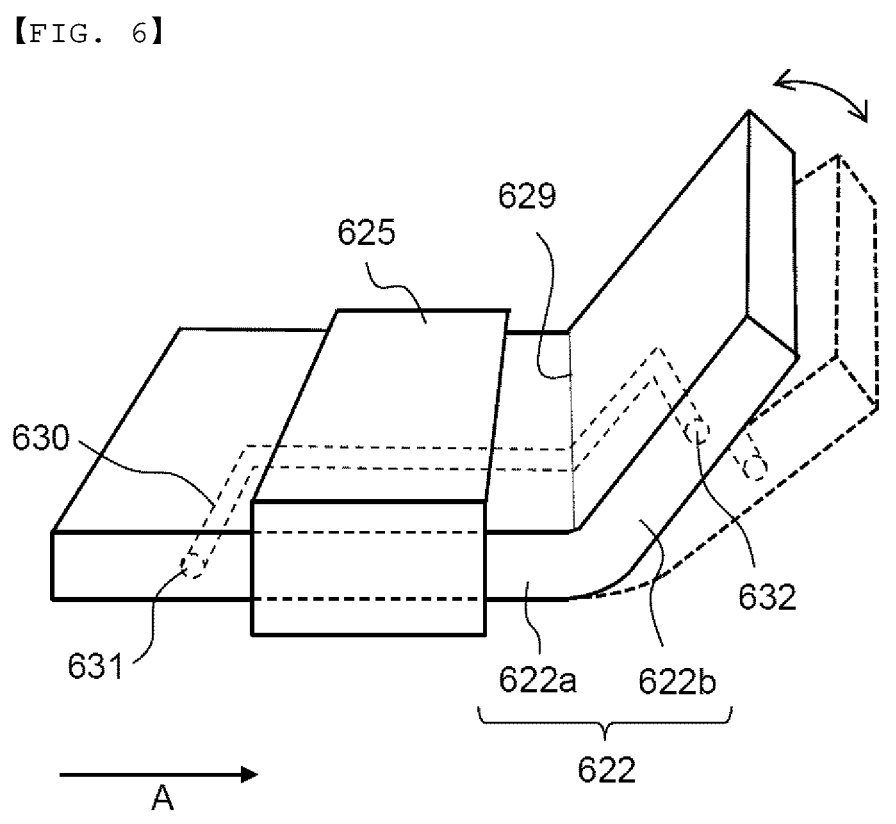

【FIG. 6】

【FIG. 7】
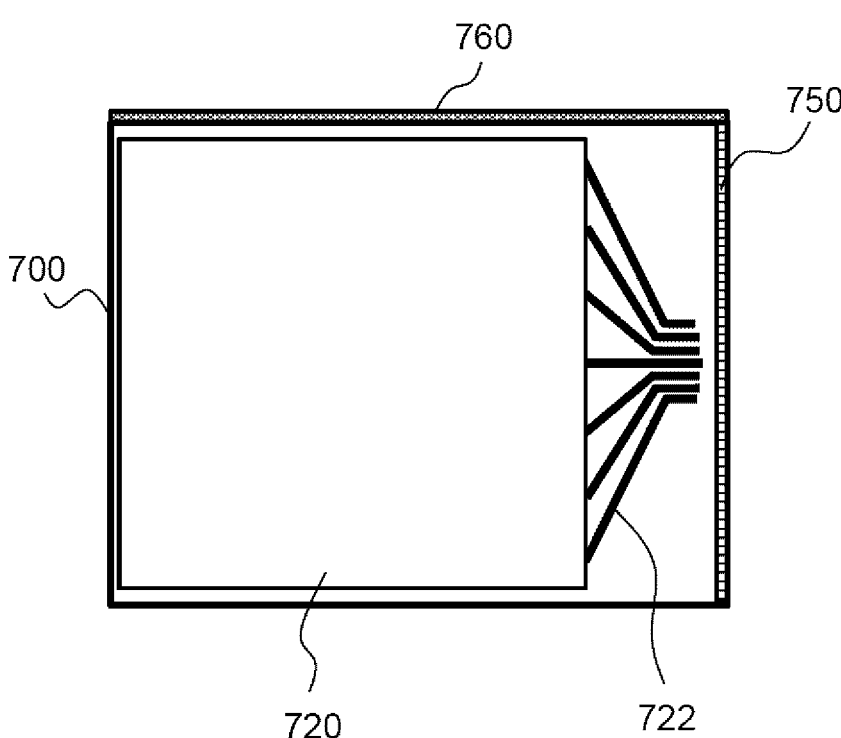

POUCH-SHAPED BATTERY CELL INCLUDING ELECTRODE LEAD CAPABLE OF MAINTAINING UNIFORM INTERNAL PRESSURE AND BATTERY PACK INCLUDING THE SAME

CROSS-REFERENCE TO RELATED APPLICATIONS

This application is a national stage entry under 35 U.S.C. § 371 of International Application No. PCT/2021/015542, filed on Nov. 1, 2021, which claims priority to Korean Patent Application No. 10-2020-0144469, filed on Nov. 2, 2020, the disclosures of which are hereby incorporated herein by reference in their entireties.

The present invention relates to a pouch-shaped battery cell including an electrode lead capable of maintaining uniform internal pressure and a battery pack including the same. More particularly, the present invention relates to a pouch-shaped battery cell including an electrode lead capable of maintaining uniform internal pressure in order to prevent deformation and explosion of the pouch-shaped battery cell due to swelling of the pouch-shaped battery cell and a battery pack including the same.

BACKGROUND ART

A lithium secondary battery, which is capable of being charged and discharged, has been widely used as an energy source for wireless mobile devices or wearable devices, and has also been used as an energy source for electric vehicles.

Depending on the kind or shape of a sheathing member, the lithium secondary battery may be classified as a pouch-shaped secondary battery made of a laminate sheet, a cylindrical secondary battery made of a metal can, or a prismatic secondary battery made of a metal can.

The pouch-shaped secondary battery is in the spotlight as power for electric vehicles, which requires a high-output, high-capacity energy source, since the pouch-shaped secondary battery can be manufactured in various sizes, is lightweight, and has high energy density.

For the lithium secondary battery, the temperature of an electrode assembly and an electrical connection member is increased by heat generated during continuous charging and discharging thereof. At a high temperature, an electrolytic solution in the lithium secondary battery is decomposed, whereby gas is generated, which swells the lithium secondary battery. For a battery pack configured such that a plurality of battery cells is fixed in a case, swollen battery cells are further compressed in the limited case, whereby a danger of ignition and explosion is increased.

In order to solve the above problem, a separate space configured to receive gas generated in the lithium secondary battery may be provided in a battery cell. However, this has the disadvantage of reducing the energy density.

Meanwhile, gas discharged from the lithium secondary battery contains a substance harmful to a human body, and it is necessary to prevent generation of such a harmful gas in order to maintain user's health and to prevent a personal accident.

Patent Document 1 discloses a battery pack including a battery cell, which includes an electrode assembly including a positive electrode tab and a negative electrode tab and a pouch case configured to hermetically seal the electrode assembly such that the positive electrode tab and the negative electrode tab are exposed; a gas sensor disposed in the vicinity of the positive electrode tab and the negative electrode tab, the gas sensor being configured to sense leakage of an electrolytic solution; and a protection circuit module configured to interrupt charging and discharging of the battery cell and to forcibly discharge the battery cell in response to an output signal of the gas sensor.

Patent Document 1 includes the gas sensor configured to sense leaked gas but does not suggest a structure capable of reducing the internal pressure of the pouch case that swells.

Patent Document 2 discloses a valve that forms a path through which the inside and the outside of a packaging container communicate with each other, wherein the valve includes a breakage valve configured to be open when the internal pressure of the packaging container is increased, a check valve configured to discharge gas in the packaging container to the outside, and a mounting portion configured to at least partially settle the path, the mounting portion being fixed to the packaging container in a state of being fitted in a film constituting the packaging container.

Patent Document 2 includes the breakage valve that is primarily open and the check valve located outside, wherein the structure of the valve is complicated, and a separate space is necessary to use the valve. In the case in which the valve is applied to a battery, energy density of the battery may be reduced. In addition, since sealability of a battery cell at the portion to which the valve is added is unreliable, there is a problem in that the battery cell including the valve further requires a portion configured to verify overall sealability of the battery cell.

Therefore, there is a need for technology capable of preventing swelling of a battery cell due to gas that is naturally or abnormally generated during use of a lithium secondary battery and rapidly sensing leakage of a substance harmful to the human body, thereby securing safety of a user.

PRIOR ART DOCUMENTS (Patent Document 1) Korean Patent Application Publication No. 2012-0051579 (2012 May 22) ("Patent Document 1")

(Patent Document 2) Japanese Patent Application Publication No. 2020-063058 (2020 Apr. 23) ("Patent Document 2")

DISCLOSURE

Technical Problem

The present invention has been made in view of the above problems, and it is an object of the present invention to provide a pouch-shaped battery cell including a gas discharge portion capable of discharging gas to the outside when the internal pressure of the pouch-shaped battery cell is increased in order to prevent swelling of the pouch-shaped battery cell and generating an alarm in the case in which the gas discharged to the outside is a gas harmful to the human body such that a user can prepare therefor and a battery pack including the same.

Technical Solution

A pouch-shaped battery cell according to the present invention to accomplish the above object includes a pouch-shaped battery cell including a battery case made of a laminate sheet, an electrode assembly received in the battery case, the electrode assembly having an electrode tab protruding therefrom, an electrode lead electrically connected to the electrode tab, the electrode lead extending outwards from the battery case, and a gas discharge portion located in the electrode lead.

The gas discharge portion may be configured to have a structure in which the inside and the outside of the pouch-shaped battery communicate with each other.

The gas discharged portion may block movement of gas when the internal pressure of the pouch-shaped battery cell is equal to or less than external pressure, and may discharge gas in the pouch-shaped battery cell when the internal pressure of the pouch-shaped battery cell is greater than the external pressure.

An inlet of the gas discharge portion may be located inside of a sealed portion of the battery case, and an outlet of the gas discharge portion may be located outside of the sealed portion of the battery case.

The gas discharge portion may be configured to have a structure in which a U-shaped pipe is received in the electrode lead, and the inlet located at an inner end of the gas discharge portion and the outlet located at an outer end of the gas discharge portion may be formed on one side surface of the electrode lead.

The gas discharge portion may include a first gas discharge portion and a second gas discharge portion, each of the gas discharge portions being formed in the shape of a U-shaped pipe, the first gas discharge portion may have a first inlet and a first outlet formed on a first side surface of the electrode lead, which is one of opposite side surfaces parallel to an extension direction of the electrode lead, and the second gas discharge portion may have a second inlet and a second outlet formed on a second side surface of the electrode lead, which is the other of the opposite side surfaces parallel to the extension direction of the electrode lead.

The gas discharge portion may be configured to have a structure in which an I-shaped pipe is received in the electrode lead, and the inlet of the gas discharge portion may be formed on a first side surface of the electrode lead, which is one of opposite side surfaces parallel to an extension direction of the electrode lead, while the outlet of the gas discharge portion is formed on a second side surface of the electrode lead, which is the other of the opposite side surfaces parallel to the extension direction of the electrode lead.

The gas discharge portion may be configured such that a third gas discharge portion and a fourth gas discharge portion, each of which is formed in an I shape, overlap each other in an X shape, the inlet of the third gas discharge portion may be formed on a first side surface of the electrode lead, which is one of opposite side surfaces parallel to an extension direction of the electrode lead, while the outlet of the third gas discharge portion is formed on a second side surface of the electrode lead, which is the other of the opposite side surfaces parallel to the extension direction of the electrode lead, and the inlet of the fourth gas discharge portion may be formed on the second side surface while the outlet of the fourth gas discharge portion is formed on the first side surface.

The electrode lead may be bent at the outside of the battery case, the electrode lead may include an inner lead disposed so as to penetrate a sealed portion of the battery case based on the bent portion and an outer lead excluding the inner lead, and an outlet of the gas discharge portion may be formed at the outer lead.

In addition, the present invention provides a battery pack including the pouch-shaped battery cell, a pack case configured to receive two or more of the pouch-shaped battery cells, a sensor member disposed outside the pouch-shaped battery cell in the pack case, the sensor member being configured to detect gas discharged from the pouch-shaped battery cell, and an alarm member configured to generate an alarm when the sensor member detects gas.

Also, the alarm member may generate different kinds of alarms depending on kinds of the gas.

In addition, the present invention may provide all possible combinations of the above solving means.

Advantageous Effects

As is apparent from the above description, a pouch-shaped battery cell according to the present invention includes a gas discharge portion configured to discharge gas generated in the pouch-shaped battery cell to the outside, whereby it is possible to prevent deformation of a battery module due to swelling of the pouch-shaped battery cell or to prevent explosion of the pouch-shaped battery cell due to an increase in internal pressure of the pouch-shaped battery cell in a limited space of the battery module or a battery pack.

In addition, the pouch-shaped battery cell according to the present invention does not require an additional space necessary to provide a gas discharge structure, since the gas discharge portion is located in an electrode lead, and therefore the present invention is easily applicable to a conventional pouch-shaped battery cell simply by replacing the electrode lead.

In addition, the inside and the outside of the pouch-shaped battery cell communicate with each other, gas is discharged depending on an increase in the internal pressure of the pouch-shaped battery cell, and therefore a separate structure configured to open and close the gas discharge portion is unnecessary, and gas may be repeatedly discharged and not discharged.

In addition, a battery pack according to the present invention includes a sensor member configured to detect gas discharged from the pouch-shaped battery cell and an alarm member configured to generate an alarm depending on the detected gas. When gas harmful to the human body is detected, therefore, an alarm signal may be generated such that a user can rapidly take shelter or take necessary measures, whereby it is possible to secure user safety.

In addition, when the amount of gas that is generated is rapidly increased due to abnormal reaction of the battery cell, the operation of the battery cell may be interrupted, whereby it is possible to prevent outbreak of fire in a device having a battery pack including the battery cell mounted therein, and the operation of the battery cell may be interrupted before the abnormal battery cell is ignited or combusted, whereby it is possible to analyze and prevent the cause of the abnormal battery cell.

DESCRIPTION OF DRAWINGS

FIG. 1 is a plan view of a pouch-shaped battery cell according to the present invention.

FIG. 2 is a partial see-through enlarged view of FIG. 1.

FIG. 3 is a plan view of an electrode lead having two U-shaped gas discharge portions formed therein.

FIG. 4 is a plan view of an electrode lead having one I-shaped gas discharge portion formed therein.

FIG. 5 is a plan view of an electrode lead having two I-shaped gas discharge portions formed therein.

FIG. 6 is a perspective view of a bent electrode lead.

FIG. 7 is a vertical sectional view of a battery pack according to the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

FIG. 1 is a plan view of a pouch-shaped battery cell according to the present invention.

Referring to FIG. 1, the pouch-shaped battery cell includes a battery case 110 made of a laminate sheet, an electrode assembly 120 received in the battery case, the electrode assembly 120 having an electrode tab 121 protruding therefrom, an electrode lead 122 electrically connected to the electrode tab 121, the electrode lead extending outwards from the battery case 110, and a gas discharge portion 130 located in the electrode lead 122.

The laminate sheet may be configured to have a layered structure in which an outer resin layer, an air and moisture blocking metal layer, and a thermally fusible inner resin layer are stacked, and may further include an adhesive layer between the outer resin layer and the metal layer and between the metal layer and the inner resin layer.

It is required for the outer resin layer to exhibit excellent tolerance to an external environment, and therefore more than predetermined tensile strength and weather resistance are necessary. In this aspect, a polymer resin constituting the outer resin layer may include polyethylene naphthalate (PEN), polyethylene terephthalate (PET), or oriented nylon, which exhibits excellent tensile strength and weather resistance.

The metal layer may be made of aluminum (Al) or an aluminum alloy in order to exhibit a function of improving strength of the battery case in addition to a function of preventing introduction of foreign matter, such as gas and moisture, or leakage of an electrolytic solution. Examples of the aluminum alloy may include alloy numbers 8079, 1N30, 8021, 3003, 3004, 3005, 3104, and 3105. These materials may be used alone or in the form of a combination of two or more thereof.

A polymer resin that exhibits thermal fusibility, has low hygroscopicity to the electrolytic solution, and is not expanded or eroded by the electrolytic solution may be used as the inner resin layer. Specifically, the inner resin layer may be made of cast polypropylene (CPP).

A lead film 125 is attached to the outer surface of the electrode lead 122 in order to increase the force of coupling between the electrode lead and the inner resin layer of the laminate sheet. A sealed portion 140 of the battery case is thermally fused so as to be hermetically sealed in the state in which the portion of the electrode lead 122 to which the lead film 125 is attached is disposed in the sealed portion 140 of the battery case, and one end of the electrode lead 122 that is not coupled to the electrode tab protrudes outwards from the battery case.

For a conventional pouch-shaped battery cell, the outer periphery of the battery case is hermetically sealed by applying heat and pressure thereto in order to prevent introduction of an external material. Even though the internal pressure of the pouch-shaped battery cell is increased due to gas generated in the pouch-shaped battery cell, no mechanism configured to discharge the gas to the outside is included.

However, the pouch-shaped battery cell may explode due to an increase in the internal pressure thereof. In the case in which the pouch-shaped battery cell is received in a limited space in a battery module or a battery pack, explosive force may be further increased.

Accordingly, in the present invention, a structure in which a gas discharge portion is formed in the electrode lead has been developed.

The gas discharge portion is configured to have a structure in which the inside and the outside of the pouch-shaped battery cell communicate with each other.

FIG. 2 is a partial see-through enlarged view of FIG. 1.

Referring to FIG. 2, an inlet 131 of the gas discharge portion 130 is located inside of the sealed portion 140 of the battery case, and an outlet 132 of the gas discharge portion 130 is located outside of the sealed portion 140 of the battery case.

The gas discharge portion 130 according to the present invention is configured to allow the inside and the outside of the battery case 110 to communicate with each other, wherein gas is discharged due to the pressure difference between the inside and the outside of the pouch-shaped battery cell.

For example, in the case in which the internal pressure of the pouch-shaped battery cell is equal to or less than external pressure, the movement of gas may be blocked. In the case in which the internal pressure of the pouch-shaped battery cell is greater than the external pressure, the gas in the pouch-shaped battery cell may be discharged.

Alternatively, in the case in which the gas discharge portion 130 is not open and the difference between the internal pressure of the pouch-shaped battery cell and the external pressure is within a predetermined range, the movement of gas may be blocked. In the case in which the internal pressure of the pouch-shaped battery cell is greater than the external pressure by more than a predetermined level, gas may be discharged through the gas discharge portion 130. When the difference between the internal pressure of the pouch-shaped battery cell and the external pressure is reduced and is within the predetermined range again as the result of the gas being discharged, gas discharge may be stopped. The pressure of the battery cell may be set to a predetermined range and may be maintained at a set value or less.

In the present invention, gas is discharged only in a direction from the inside to the outside of the battery cell, and therefore moisture, which may cause performance degradation of the battery cell, is not introduced.

In addition, even in the case in which gas is inevitably generated due to decomposition of an electrolytic solution caused by an increase in ambient temperature, the gas may be discharged at any time during operation of the battery cell, and therefore it is possible to prevent explosion of the battery cell due to an increase in the internal pressure thereof or to prevent a portion of the sealed portion from being vented.

The gas discharge portion 130 of FIG. 2 is configured to have a structure in which a U-shaped pipe is received in the electrode lead 122. The inlet 131, which is located at the inner end of the gas discharge portion 130, and the outlet 132, which is located at the outer end of the gas discharge portion, are formed on one side surface 127 of the electrode lead 122.

That is, the inlet 131 and the outlet 132 of the gas discharge portion 130 are open in the same direction.

FIG. 3 is a plan view of an electrode lead having two U-shaped gas discharge portions 230 formed therein.

Referring to FIG. 3, a lead film 225 is attached to the upper surface and the lower surface of the electrode lead 222 in order to increase the force of adhesion between the electrode lead and the battery case.

The gas discharge portions 230 include a first gas discharge portion 230a and a second gas discharge portion 230b, each of which is formed in the shape of a pipe curved into a U shape.

The first gas discharge portion 230a has a first inlet 231a and a first outlet 232a formed on a first side surface of the electrode lead 222, which is one of opposite side surfaces parallel to an extension direction A of the electrode lead. The second gas discharge portion 230b has a second inlet 231b and a second outlet 232b formed on a second side surface of the electrode lead 222, which is the other of the opposite side surfaces parallel to the extension direction A of the electrode lead.

In the case in which a plurality of gas discharge portions is provided, as in the gas discharge portions of FIG. 3, gas discharge speed may be increased. Gas in the pouch-shaped battery cell may be rapidly discharged, whereby it is possible to maintain uniform internal pressure of the pouch-shaped battery cell.

In addition, two or more gas discharge portions may be provided in consideration of the case in which any one of the gas discharge portions malfunctions or is damaged by external force.

FIG. 4 is a plan view of an electrode lead having one I-shaped gas discharge portion formed therein.

Referring to FIG. 4, lead films 325 and 425 configured to secure the force of adhesion to the battery case are attached to the upper surfaces and the lower surfaces of electrode leads 322 and 422, respectively.

Each of the gas discharge portions 330 and 430 is formed in the shape of an I-shaped pipe, and is received in a corresponding one of the electrode leads 322 and 422. An inlet 331 of the gas discharge portion 330 is formed on a first side surface of the electrode lead 322, which is one of opposite side surfaces parallel to an extension direction A of the electrode lead, and an outlet 332 of the gas discharge portion 330 is formed on a second side surface of the electrode lead 322, which is the other of the opposite side surfaces parallel to the extension direction A of the electrode lead.

The gas discharge portion 430 is symmetrical with the gas discharge portion 330. An inlet 431 of the gas discharge portion 430 is formed on a second side surface of the electrode lead 422, which is one of opposite side surfaces parallel to an extension direction A of the electrode lead, and an outlet 432 of the gas discharge portion 430 is formed on a first side surface of the electrode lead 422, which is the other of the opposite side surfaces parallel to the extension direction A of the electrode lead.

In the case in which the gas discharge portion is formed in the shape of an I-shaped pipe, as shown in FIG. 4, a gas discharge path is formed in a straight line, whereby gas may be rapidly discharged.

Although FIG. 4 shows two electrode leads 322 and 422, the two electrode leads are simultaneously shown in order to explain the shape of the gas discharged portion formed in each of the electrode leads, and therefore the two electrode leads are not necessarily disposed together, as in FIG. 4.

FIG. 5 is a plan view of an electrode lead having two I-shaped gas discharge portions formed therein.

Referring to FIG. 5, the gas discharge portions 530 is configured such that a third gas discharge portion 530c and a fourth gas discharge portion 530d, each of which is formed in an I shape, overlap each other in an X shape. In addition, the third gas discharge portion 530c and the fourth gas discharge portion 530d may communicate with each other.

A lead film 525 configured to secure the force of adhesion to the battery case is attached to the upper surface and the lower surface of the electrode lead 522.

A third inlet 531c of the third gas discharge portion 530c is formed on a first side surface of the electrode lead 522, which is one of opposite side surfaces parallel to an extension direction A of the electrode lead, and a third outlet 532c of the third gas discharge portion 530c is formed on a second side surface of the electrode lead 522, which is the other of the opposite side surfaces parallel to the extension direction A of the electrode lead. A fourth inlet 531d of the fourth gas discharge portion 530d is formed on the second side surface, and a fourth outlet 532d of the fourth gas discharge portion 530d is formed on the first side surface.

In the case in which gas discharge portions 530 disposed in an X shape are provided, as described above, gas may be introduced and discharged at each of the first side surface and the second side surface irrespective of the position at which the gas is generated. In addition, each of the gas discharge portions is formed in a straight line, whereby it is possible to rapidly reduce the internal pressure of the pouch-shaped battery cell.

FIG. 6 is a perspective view of a bent electrode lead.

Referring to FIG. 6, the electrode lead 622 has a bent portion 629. In general, when electrode leads are electrically connected to each other in the case in which without a connection member, such as a busbar, in the state in which a plurality of pouch-shaped battery cells is stacked in order to increase energy density, the electrode lead is bent. When an electrode tab bundle is coupled to the electrode lead by welding in a parallel state and then the electrode lead is bent, tensile strength is applied in an extension direction of the electrode lead, whereby the electrode tab may be cut or a weld portion may be damaged.

In the case in which a bent electrode lead is used, as in the electrode lead of FIG. 6, it is possible to prevent the electrode tab from being cut and the weld portion from being damaged. In addition, the bending angle of the electrode lead may be freely selected as needed within a range of 0 to 90 degrees.

A lead film 625 configured to secure the force of adhesion to the battery case is attached to the upper surface and the lower surface of the electrode lead 622.

The bent portion 629 of the electrode lead 622 is formed at the outside of the battery case, and the electrode lead 622 is divided into an inner lead 622*a*, which penetrates the lead film 625 disposed in the sealed portion of the battery case based on the bent portion 629, and an outer lead 622*b* located outside of the lead film 625.

A gas discharge portion 630 is formed in a U shape, as shown in FIG. 2, and is located in the electrode lead 622. An inlet 631 is formed at the inner lead 622*a*, and an outlet 632 is formed at the outer lead 622*b*.

In the case in which a plurality of pouch-shaped battery cells is disposed in a battery pack in a stacked state, the bending angle of the electrode leads is changed depending on the number of pouch-shaped battery cells. Consequently, it is preferable for an inner path of the gas discharge portion to be formed in a shape that is not bent or curved irrespective of the bending angle of the electrode lead.

In FIG. 6, one gas discharge portion 630 formed in a U shape is shown. However, the gas discharge portion 630 may be replaced with one of the gas discharge portions shown in FIGS. 3 to 5.

FIG. 7 is a vertical sectional view of a battery pack according to the present invention.

Referring to FIG. 7, an electrode assembly 720, in which a plurality of pouch-shaped battery cells is stacked, is received in a pack case 700, and a plurality of electrode leads 722 protrudes from the electrode assembly 720 in one direction so as to be electrically connected to each other.

Each of the electrode leads 722 has a gas discharge portion formed therein. A sensor member 750 configured to detect gas discharged from the pouch-shaped battery cells is disposed outside the pouch-shaped battery cells in the pack case 700. In addition, an alarm member 760 configured to generate different kinds of alarms depending on kinds of gas detected by the sensor member 750 is attached to the outer surface of one side of the pack case 700.

The alarm member 760 may generate, for example, a visual alarm or an audible alarm. In addition, when the kinds of gas are harmful or harmless to a human body, different kinds of alarm signals may be generated.

In the present invention, as described above, the gas discharge portion is located in the electrode lead, whereby it is possible to maintain the internal pressure of the pouch-shaped battery cell within a predetermined range without changing the size of the pouch-shaped battery cell and with a structure in which no separate member is additionally added. Also, in the case in which gas discharged from the pouch-shaped battery cell is harmful to the human body, an alarm may be generated such that a user can rapidly take shelter or prepare therefor. Consequently, it is possible to provide a pouch-shaped battery cell with improved user safety as well as safety of the battery cell.

Also, in the present invention, when the amount of gas discharged from the cell is battery instantaneously increased or the battery cell is abnormally operated, the operation of the battery cell may be interrupted before the battery cell is ignited or combusted, whereby it is possible to analyze the cause of the battery cell that becomes a problem and to prevent the problem.

Those skilled in the art to which the present invention pertains will appreciate that various applications and modifications are possible within the category of the present invention based on the above description.

DESCRIPTION OF REFERENCE SYMBOLS

110: Battery case
121: Electrode tab
120, 720: Electrode assemblies
122, 222, 322, 422, 522, 622, 722: Electrode leads
125, 225, 325, 425, 525, 625: Lead films
127: Side surface
130, 230, 330, 430, 530, 630: Gas discharge portions
131, 331, 431, 631: Inlets
132, 332, 432, 632: Outlets
140: Sealed portion
230*a*: First gas discharge portion
230*b*: Second gas discharge portion
231*a*: First inlet
232*a*: First outlet
231*b*: Second inlet
232*b*: Second outlet
530*c*: Third gas discharge portion
530*d*: Fourth gas discharge portion
531*c*: Third inlet
532*c*: Third outlet
531*d*: Fourth inlet
532*d*: Fourth outlet
622*a*: Inner lead
622*b*: Outer lead
629: Bent portion
700: Pack case
750: Sensor member
760: Alarm member

INDUSTRIAL APPLICABILITY

As is apparent from the above description, a pouch-shaped battery cell according to the present invention includes a gas discharge portion configured to discharge gas generated in the pouch-shaped battery cell to the outside, whereby it is possible to prevent deformation of a battery module due to swelling of the pouch-shaped battery cell or to prevent explosion of the pouch-shaped battery cell due to an increase in internal pressure of the pouch-shaped battery cell in a limited space of the battery module or a battery pack.

In addition, the pouch-shaped battery cell according to the present invention does not require an additional space necessary to provide a gas discharge structure, since the gas discharge portion is located in an electrode lead, and therefore the present invention is easily applicable to a conventional pouch-shaped battery cell only by replacing the electrode lead.

In addition, the inside and the outside of the pouch-shaped battery cell communicate with each other, gas is discharged depending on an increase in the internal pressure of the pouch-shaped battery cell, and therefore a separate structure configured to open and close the gas discharge portion is unnecessary, and gas may be repeatedly discharged and not discharged.

In addition, a battery pack according to the present invention includes a sensor member configured to detect gas discharged from the pouch-shaped battery cell and an alarm member configured to generate an alarm depending on the detected gas. When gas harmful to the human body is detected, therefore, an alarm signal may be generated such that a user can rapidly take shelter or take necessary measures, whereby it is possible to secure user safety.

In addition, when the amount of gas that is generated is rapidly increased due to abnormal reaction of the battery cell, the operation of the battery cell may be interrupted, whereby it is possible to prevent outbreak of fire in a device having a battery pack including the battery cell mounted therein, and the operation of the battery cell may be interrupted before the abnormal battery cell is ignited or combusted, whereby it is possible to analyze and prevent the cause of the abnormal battery cell.

The invention claimed is:

1. A pouch-shaped battery cell comprising:

a battery case made of a laminate sheet;

an electrode assembly received in the battery case, the electrode assembly having an electrode tab protruding therefrom;

an electrode lead electrically connected to the electrode tab, the electrode lead extending outwards from the battery case; and a gas discharge portion extending within the electrode lead, wherein the gas discharge portion is configured to block movement of gas when an internal pressure of the pouch-shaped battery cell is equal to or less than an external pressure at an outside of the pouch-shaped battery cell, and to discharge gas in the pouch-shaped battery cell when the internal pressure of the pouch-shaped battery cell is greater than the external pressure, and without a separate structure configured to close the gas discharge portion.

2. The pouch-shaped battery cell according to claim 1, wherein the gas discharge portion provides communication between an inside of the pouch-shaped battery cell and the outside of the pouch-shaped battery cell.

3. The pouch-shaped battery cell according to claim 1, wherein the gas discharge portion has an inlet located inside of a sealed portion of the battery case, and the gas discharge portion has an outlet located outside of the sealed portion of the battery case.

4. The pouch-shaped battery cell according to claim 3, wherein the gas discharge portion comprises a U-shaped pipe received within the electrode lead, and the inlet and the outlet are each located on a same side surface of the electrode lead.

5. The pouch-shaped battery cell according to claim 4, wherein the gas discharge portion comprises a first gas discharge passage and a second gas discharge passage, each of the gas discharge passages having a U-shaped pipe shape, the first gas discharge passage has a first inlet and a first outlet formed on a first side surface of the electrode lead, the first side surface extending parallel to an extension direction of the electrode lead, and the second gas discharge passage has a second inlet and a second outlet formed on a second side surface of the electrode lead, the second side surface being opposite from the first side surface and extending parallel to the extension direction of the electrode lead.

6. The pouch-shaped battery cell according to claim 3, wherein the gas discharge portion comprises an I-shaped pipe received within the electrode lead, the inlet of the gas discharge portion is located on a first side surface of the electrode lead, the first side surface extending parallel to an extension direction of the electrode lead, and the outlet of the gas discharge portion is located on a second side surface of the electrode lead, the second side surface being opposite from the first side surface and extending parallel to the extension direction of the electrode lead.

7. The pouch-shaped battery cell according to claim 4, wherein the gas discharge portion comprises a first gas discharge passage and a second gas discharge passage each having an I shape and overlapping each other in an X shape, an inlet of the first gas discharge passage is located on a first side surface of the electrode lead extending parallel to an extension direction of the electrode lead, and an outlet of the first gas discharge passage is located on a second side surface of the electrode lead opposite the first side surface and extending parallel to the extension direction of the electrode lead, and an inlet of the second gas discharge passage is located on the second side surface and an outlet of the second gas discharge passage is located on the first side surface.

8. The pouch-shaped battery cell according to claim 1, wherein the electrode lead is bent at an outside of the battery case, the electrode lead comprises an inner lead portion disposed penetrating a sealed portion of the battery case and an outer lead portion extending from the inner lead portion and located outside of the sealed portion of the battery case, and an outlet of the gas discharge portion is located at a surface of the outer lead.

9. A battery pack comprising:

a pack case having two or more pouch-shaped battery cells received therein, each of the two or more pouch-shaped battery cells being the pouch-shaped battery cell according to claim 1;

a sensor member disposed in the pack case and outside of the two or more pouch-shaped battery cells, the sensor member being configured to detect a gas discharged from the two or more pouch-shaped battery cells; and an alarm member configured to generate an alarm when the sensor member detects the gas.

10. The battery pack according to claim 9, wherein the gas detected by the sensor member comprises different types of gases and where in the alarm member is configured to generate a different alarm for each of the different types of gases.

* * * * *